United States Patent [19]
Brown et al.

[11] Patent Number: 5,714,077
[45] Date of Patent: Feb. 3, 1998

[54] LIQUID FILTRATION SYSTEM

[75] Inventors: David John Brown, Poole; Stephen Geoffrey Higson, Cheshire, both of United Kingdom

[73] Assignee: British Nuclear Fuels plc, Cheshire, United Kingdom

[21] Appl. No.: 564,159

[22] PCT Filed: Apr. 22, 1994

[86] PCT No.: PCT/GB94/00854

§ 371 Date: Feb. 9, 1996

§ 102(e) Date: Feb. 9, 1996

[87] PCT Pub. No.: WO95/29004

PCT Pub. Date: Nov. 2, 1995

[30] Foreign Application Priority Data

Apr. 20, 1993 [GB] United Kingdom .................. 9308085

[51] Int. Cl.⁶ .................. B01D 24/10; B01D 35/02
[52] U.S. Cl. .................. 210/747; 210/793; 210/798; 210/807; 210/170; 210/274; 210/275; 210/285; 210/286
[58] Field of Search .................. 210/274, 275, 210/269, 170, 747, 688, 284, 285, 807, 286, 793, 798

[56] References Cited

U.S. PATENT DOCUMENTS

| 130,316 | 8/1872 | Robinson | 210/286 |
|---|---|---|---|
| 417,766 | 12/1889 | Aspden | 210/286 |
| 471,811 | 3/1892 | Deutsch | 210/274 |
| 614,594 | 11/1898 | Williamson | 210/274 |
| 628,987 | 7/1899 | Maignen | 210/274 |
| 668,344 | 2/1901 | Wilson | 210/274 |
| 1,182,465 | 5/1916 | Evans | 210/286 |
| 1,450,770 | 4/1923 | Phillip | 210/92 |
| 2,369,915 | 2/1945 | Quinn | 210/135 |
| 3,812,969 | 5/1974 | Maroney | 210/274 |
| 4,473,477 | 9/1984 | Beall | 210/747 |
| 4,501,665 | 2/1985 | Wilhelmson | 210/170 |
| 4,543,013 | 9/1985 | Wagner et al. | 210/170 |
| 4,689,145 | 8/1987 | Mathews et al. | 210/170 |
| 4,781,841 | 11/1988 | Someya | 210/912 |
| 4,904,386 | 2/1990 | Kickuth | 210/747 |
| 4,908,129 | 3/1990 | Finsterwalder et al. | 210/170 |
| 4,997,568 | 3/1991 | Vanderveld et al. | 210/170 |
| 5,238,560 | 8/1993 | Lange | 210/286 |
| 5,281,332 | 1/1994 | Vanderveld et al. | 210/170 |
| 5,322,629 | 6/1994 | Stewart | 210/170 |
| 5,330,651 | 7/1994 | Robertson et al. | 210/617 |
| 5,437,786 | 8/1995 | Horsley et al. | 210/170 |

FOREIGN PATENT DOCUMENTS

| 0 530 672 | 3/1993 | European Pat. Off. |
| 91/10624 | 7/1991 | WIPO |

*Primary Examiner*—Cynthia L. Nessler
*Attorney, Agent, or Firm*—Nixon & Vanderhye P.C.

[57] ABSTRACT

An automatically-regulated, self-flushing method of filtering a liquid suspension includes passing the suspension through a granular filter material. The flow of suspension is halted to relieve the pressure in the system, so facilitating the settling of the removed particles down the filter. Further settling of the particles may be achieved by passing an airstream through the filter material. A reverse flow of the filtrate then effects a backwashing action on the filter material so that further settling of the particles is encouraged. The filter material may be contained in a drain passage which follows a generally sinuous path. The drain passage may serve a waste landfill site in which toxic, hazardous or domestic waste is disposed.

17 Claims, 2 Drawing Sheets

LIQUID FILTRATION SYSTEM

BACKGROUND OF THE INVENTION

FIELD OF THE INVENTION

This invention relates to a liquid filtration system for industrial effluent discharges and particularly, though not exclusively, to a filtration system incorporated in a drain for a waste landfill sate.

A waste landfill site ma be defined as an excavated trench in which waste material is disposed and covered by the removed soil and by a suitable capping.

Leachate emanating from waste landfill site, or other effluent discharge requires discharging in a controlled manner. Known systems for draining the leachate, which is usually in the form of an aqueous suspension, include equipment such as pipes, valves and pumps for transporting the leachate away from the storage area, and they exhibit only finite lifetime.

Suitable filter material, are normally included in the drainage systems to restrict the maximum size of solid particles in the discharge of flowing through the system to prevent blockage of the drain. However, the filter material slowly becomes blocked by the particles removed from the discharge. Facilities for cleaning the filter may be provided, most commonly by backwashing or by other mechanical means. Such filter cleaning methods require action by an operator to instigate and control the filter cleaning procedure.

It is obviously a disadvantage of the above-mentioned systems that a large amount of maintenance is required to ensure that efficient filtration and drainage of the discharge can be effected over a long period of time.

SUMMARY OF THE INVENTION

According to the invention in a first aspect we provide a method of filtering a liquid suspension, said method comprising the steps of passing the liquid suspension through a granular filter material so as to remove solid particles from said suspension to produce a filtrate, halting the flow of liquid suspension through the filter material thereby relieving the pressure in the system and facilitating particulate matter to settle down the filter, and causing a reverse flow of the filtrate through the filter material, whereby said particles retained by the filter material are further encouraged to settle to a lower region thereof.

Prior to the step of causing a reverse flow of the filtrate, an airstream may be passed though the filter material so as to agitate the filter material granules, thereby facilitating further settlement of the filtered particles.

The liquid suspension ma comprise a discharge or seepage from a landfill site for storage, burial or disposal of waste material. The waste material may include hazardous material such as toxid or radioactive waste material. For example the waster material may include heavy metals such as nickel, zinc, cadmium, copper, cobalt, mercury, lead or low level radioactive waste which is defined in the United Kingdom as Waste containing radioactive materials other than those acceptable for dustbin disposal, but not exceeding 4 GBq/te alpha or 12 GBq/te beta/gamma. Where contaminants may have dissolved in the liquid suspension these may be removed therefrom by another chemical or biochemical treatment process as will be apparent to those skilled in the art.

According to a further aspect of the invention we provide apparatus for filtering a liquid suspension in accordance with the above method according to the first aspect, said apparatus comprising a passage having an inlet end and an outlet end, the inlet end being at a higher position than said outlet end, wherein the passage between said inlet and outlet ends is formed in a substantially sinuous path, and wherein a granular filter material is located in at least a portion of said sinuous path.

Preferably the said passage comprises a series of intercommunicating substantially vertical and substantially horizontal sections.

In one embodiment the passage includes a first vertical section, the upper end of which provides the inlet end of the passage, a first horizontal section communicating with a lower end of said first vertical section, a second vertical section communicating at its lower end with the first horizontal section, a second horizontal section communicating with an upper end of the second vertical section, and a third vertical section, the upper end of which communicates with the second horizontal section and the lower end of which provides the outlet end of said passage.

The second horizontal section is preferably lower than the inlet at the upper end of the first vertical section.

Preferably the outlet end of the third vertical section is substantially lower than the first horizontal section.

Desirably, the filter material is located in at least one of the first or second vertical sections or said first horizontal section. The filter material may, if desired, be located in each of these sections.

The filter material may comprise a granular material such as coarse or fine sand (granulated silica) or coarse aggregate such as limestone chips.

In one example, the passage may communicate with a waste landfill site, such as a shallow land waste disposal site containing toxic or hazardous waste, so as to drain and filter leachate emanating therefrom. For example, the disposal site may comprise open excavated trenches for domestic waste.

The invention is described with particular reference to a waste landfill site but it will be appreciated that it could be utilized for other applications requiring the filtration of liquids.

The filtration system according to the present invention has the advantage that valves and pumps are not required for its operation. Automatic and regular flushing of the filter material and drain passage is carried out without any manual operation or control, thereby allowing greater use of the filter void space for solids entrapment. These advantages result in a system which will operate efficiently over a long period of time, while requiring a minimum amount of maintenance.

A particular advantage the filtration system according to the invention that fine suspended solids can be efficiently removed tom the leachate using coarser filter aggregate than is co conventionally used.

Although the invention as been described as particularly associated with a drainage system for a waste landfill site, it can be used with advantage in other applications. Other suitable applications include filtration systems used in the water supply and other industries which require licensed disposal of effluents.

BRIEF DESCRIPTION OF THE DRAWINGS

Embodiments of the invention will now be described, by way of example, with reference to the accompanying drawings, in which.

DETAILED DESCRIPTION OF PREFERRED EMBODIMENTS

Figure 1:
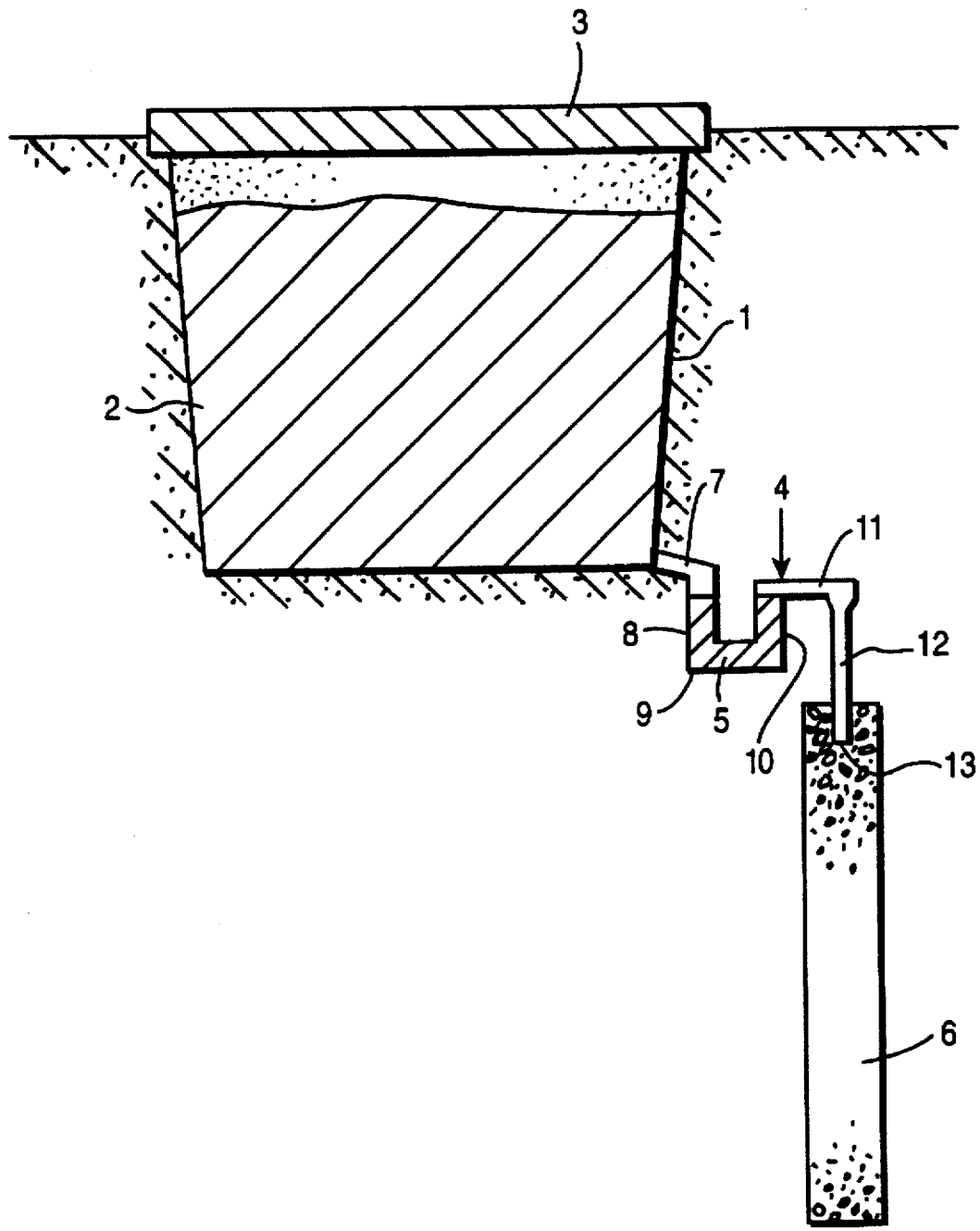
FIG. 1 shows a cross action through a waste landfill site provided with a filtration and drainage system.

Referring to FIG. 1, waste landfill site includes a shallow excavated trench 1 or the disposal of a waste 2 is formed in the ground and covered by a suitable capping 3. The waste in the trench 1 may be toxic or hazardous, such as low level radioactive waste. Leachate, in the form of an aqueous suspension, is drained from the trench 1 through a drain passage 4 provided with a granular filter material 5. The drain passage 4 directs the leachate to a vertical well 6 extending deep into the ground. Suitably the drain passage 4 may be made from fired clay or other longlasting durable material. Preferably the well 6 is filled with granular material, such as sands (granulated silica), gravels or cobbles.

Figure 2:
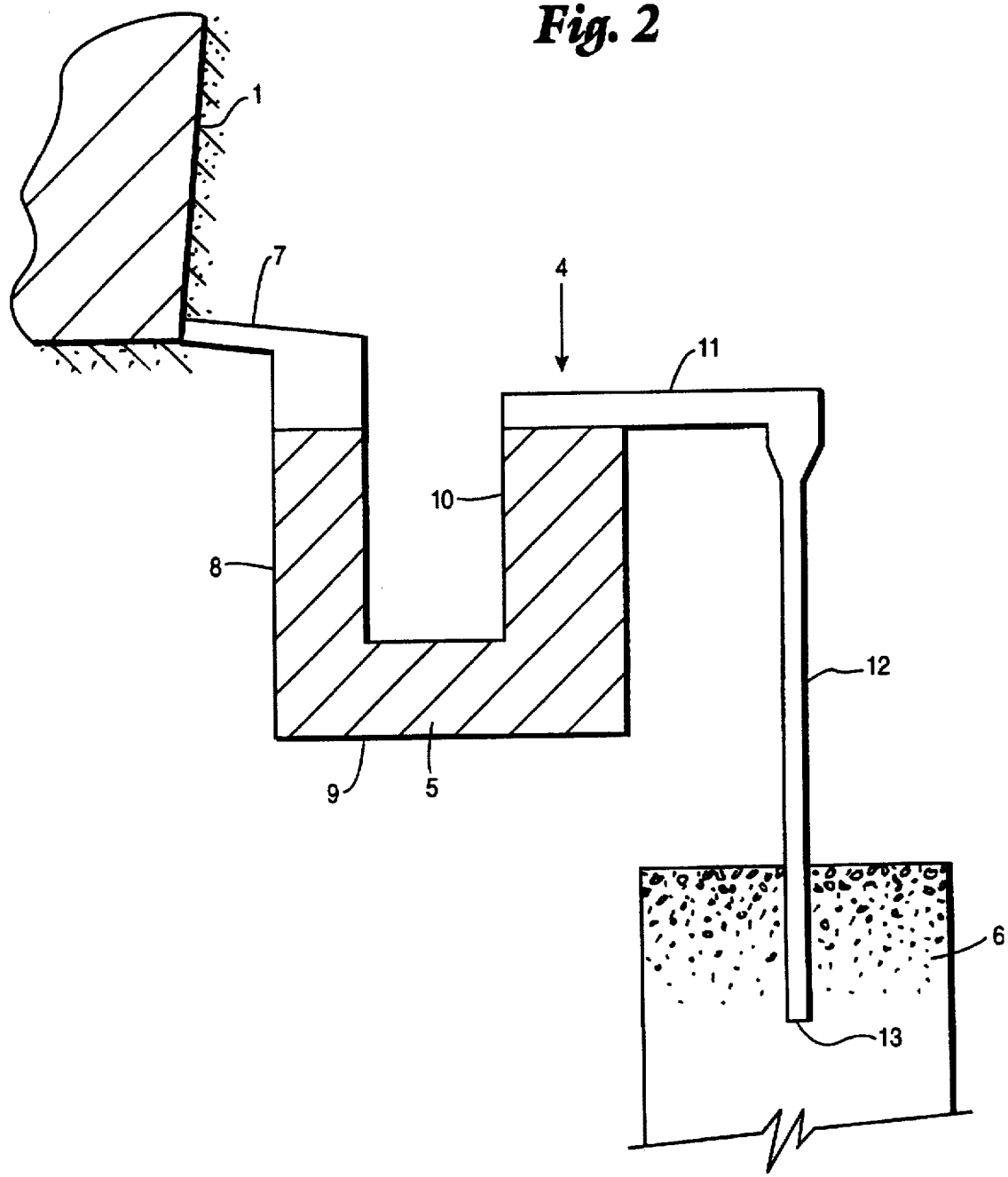
FIG. 2 is an enlarged diagram of a drain passage for the filtration and drainage system for the site shown in FIG. 1.

The drain passage 4, shown in greater detail in FIG. 2, is substantially of sinuous form comprising a series of vertical and horizontal sections. An inlet 7 leading from the trench 1 communicates with the upper end of a first vertical section 8, the lower end of which is connected to a first horizontal section 9. A second vertical section 10 extends upwardly from the end of the section 9 and connects to the inlet end of the second horizontal section 11 first vertical section 8. Extending downwardly from the outlet end of the second horizontal section 11 is a third vertical section 12 which terminates at its lower end at filtrate outlet 13 in the vertical well 6.

For satisfactory operation, the second horizontal section 11 is positioned at lower level than the inlet at the upper end of the first vertical section 8 and the outlet end of the third vertical section 12 is at a substantially lower level than that of the first horizontal section 9. Advantageously, the outlet 13 is positioned at a substantially lower level than that of the first horizontal section 5. The outlet 13 may direct the filtrate to a collection means other than a well, such as, for example, a reservoir.

The first, vertical section 8, the first horizontal section 9 and the second vertical section 10 are filled with a granular filter material 5. A suitable filter material may comprise a medium/coarse said (granulated silica), gravels or cobbles.

To activate the siphon function and draw the leachate through the drain passage the third vertical section 12 and the second horizontal section 11 have small cross sectional areas compared with the cross sectional areas of the other sections of the passage.

It will be apparent that the sections 8, 10, 12 of the drain passage need not be perfectly vertical and either one or all of these sections could be inclined. The horizontal sections 9, 11 may be curved.

In use, leachate in the form of an aqueous suspension of fine silt particles emanating from the waste 2 disposed in the trench 1 enters the rain passage 4 through an inlet 7. Over a period of time, leachers flowing at a low rate eventually fills the first vertical section 8, the first horizontal section 9 and the second vertical section 10. Silt particles are removed from the leachate are allowed to settle within the filter material 5. After a further period of time the second horizontal section 11 becomes filled with filtrate.

At this stage, the pressure head at the inlet end of the drain passage 4 causes an outlet flow of filtrate down the third vertical section 12. The leachate filtrate flows at a high rate down the third vertical section 12 and into the well 6 through the filtrate outlet duct 13. This flow causes a negative pressure head which draws the leachers through the filter material. After the leachers has drained from the first vertical section 8 a volume of air is drawn into the filter by the head of leachate draining from the third vertical section 12. This airstream has the possibility of being drawn through sections 9 and 10, agitating the filter material 5, and thus, due to the pressure relief in the system, facilitates the release of any particles removed from the leachate that have become stuck in the material. The released particles will eventually tend to percolate down through the filter material and settle towards the lower region of the filter.

The outlet flow stops when the pressure at the out fat end of the drain passage 4 is equal to the pressure at the inlet end. To completely obtain equilibrium, the leachate in the second vertical section 10 needs to drain through the first horizontal section 9 and up into the first vertical section 8 until the levels of the filtrate in the first and second vertical sections 8, 10 are equal. As the reverse flow of the filtrate passes through the second vertical section 10 and the first horizontal section 9 it effects a backwashing action so as to further dislodge the particulate matter from the filter material 5.

Although the filtration and drainage system has been described with the filter material 5 located in the first and second vertical sections 8 and 10 and the first horizontal section 9, it will be appreciated that the material could be situated in only one of these sections or a combination of sections.

A particular advantage of the filtration system is that fine suspended solids can be efficiently removed from the leachate using coarser filter aggregate than is conventionally used.

Although the invention been described as particularly associated with a drainage system for a waste landfill site, it can be used with advantage in other applications. Other suitable applications include filtration systems used in the water supply and other industries which require the licensed disposal of effluents.

We claim:

1. Apparatus for filtering a liquid suspension comprising:
    a passage through which a liquid suspension may be passed, said passage having an inlet end and an outlet end, the inlet end being at a higher vertical position than said outlet end, wherein the passage between said inlet and outlet ends is formed in a substantially sinuous path, and wherein the passage comprises:
        a first vertical section, the upper end of said first vertical section provides the inlet end of the passage,
        a first horizontal section communicating with a lower end of said first vertical section,
        a second vertical section communicating at a lower end with the first horizontal section,
        a second horizontal section communicating with an upper end of the second vertical section, and
        a third vertical section, an upper end of said third vertical section communicates with the second horizontal section and a lower end of said third vertical section provides the outlet end of the passage, the second horizontal section and third vertical section both having smaller cross-sectional areas compared with cross-sectional areas of the other sections of the passage; and
    a granular filter material located in at least a portion of said sinuous path so as to remove solid particles from a liquid suspension and produce a filtrate;
    whereby in operation the liquid suspension flows toward said outlet end by means of a siphon effect, a halting of the liquid suspension flow permits particulate matter to settle down the filter material, and a reverse flow of liquid through the filter material causes particles retained by the filter material to settle to a lower region thereof.

2. Apparatus according to claim 1, wherein the second horizontal section is at a position lower than the inlet at the upper end of the first vertical section.

3. Apparatus according to claim 1, wherein the outlet end of the third vertical section is at a position lower than that of the first horizontal section.

4. Apparatus according to claim 1, wherein the granular filter material comprises sand.

5. Apparatus according to claim 1, wherein the granular filter material comprises a coarse aggregate.

6. Apparatus according to claim 1, wherein the granular filter material is located in at least one of said first or second vertical sections or said first horizontal section.

7. Apparatus according to claim 6, wherein the granular filter material is located in said first and second vertical sections and said first horizontal section.

8. Apparatus according to claim 1, wherein the passage forms a drain passage communicating with a waste landfill site.

9. Apparatus according to claim 8, wherein an outlet end of the drain passage communicates with an underground well which receives filtrate from said passage.

10. A method of filtering a liquid suspension using the apparatus of claim 1, comprising the steps of:

passing the liquid suspension into the passage through said inlet and allowing liquid flow toward said outlet end by a siphon effect;

halting of the liquid flow during which particulate matter is allowed to settle down the filter material; and causing a reverse flow of liquid through the filter material during which the particles retained by the filter material are further encouraged to settle to a lower region thereof.

11. A method according to claim 10, wherein before the step of causing the reverse flow of the filtrate, an airstream is passed through the filter material so as to agitate the filter material granules, thereby facilitating further settlement of the filtered particles.

12. A method according to claim 10, wherein the liquid suspension comprises a discharge from a waste landfill site.

13. A method according to claim 10, wherein the liquid suspension contains toxic or hazardous substances.

14. A method according to claim 13, wherein the liquid suspension contains radioactive substances.

15. A method according to claim 13, wherein the liquid suspension contains heavy metals.

16. Apparatus for filtering a liquid suspension comprising:

a passage having an inlet end and an outlet end, the inlet end being at a higher vertical position than said outlet end, wherein the passage between said inlet and outlet ends is formed in a substantially sinuous path, and a granular material is located in at least a portion of said sinuous path wherein the passage forms a drain passage communicating with a waste landfill site.

17. Apparatus according to claim 16 wherein an outlet end of the passage communicates with an underground well which receives filtrate said passage.

* * * * *

UNITED STATES PATENT AND TRADEMARK OFFICE
CERTIFICATE OF CORRECTION

PATENT NO. : 5,714,077

DATED : February 3, 1998

INVENTOR(S) : David John Brown, et al

It is certified that error appears in the above-identified patent and that said Letters Patent is hereby corrected as shown below:

Column 1, line 22, delete "of".
Column 1, line 52, "ma" should be -- may --.
Column 1, line 55, "toxid" should be -- toxic --.
Column 1, line 56, "waster" should be -- waste --.
Column 2, line 53, "tom" should be -- from --.
Column 2, line 54, delete "co".
Column 3, line 43, "said" should be -- sand --.
Column 3, line 57, "leachers" should be -- leachate --.
Column 4, line 1, "leachers" should be -- leachate --.
Column 4, line 2, "leachers" should be -- leachate --.
Column 4, line 12, "out fat" should be -- outlet --.
Column 4, line 32, after "invention" insert -- has --.

Signed and Sealed this

Second Day of June, 1998

*Attest:*

BRUCE LEHMAN

*Attesting Officer*  *Commissioner of Patents and Trademarks*